US012574706B2

(12) United States Patent
Baek et al.

(10) Patent No.: US 12,574,706 B2
(45) Date of Patent: Mar. 10, 2026

(54) NETWORK STRUCTURE AND SERVICE PROVIDING METHOD FOR SUPPORTING MULTICAST AND BROADCAST SERVICE IN MOBILE COMMUNICATION NETWORK

(71) Applicant: Samsung Electronics Co., Ltd., Suwon-si (KR)

(72) Inventors: Youngkyo Baek, Suwon-si (KR); Sangsoo Jeong, Suwon-si (KR); Jungje Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 319 days.

(21) Appl. No.: 17/637,435

(22) PCT Filed: Aug. 24, 2020

(86) PCT No.: PCT/KR2020/011228
§ 371 (c)(1),
(2) Date: Feb. 22, 2022

(87) PCT Pub. No.: WO2021/040346
PCT Pub. Date: Mar. 4, 2021

(65) Prior Publication Data
US 2022/0279319 A1 Sep. 1, 2022

(30) Foreign Application Priority Data

Aug. 23, 2019 (KR) ........................ 10-2019-0104061

(51) Int. Cl.
*H04W 4/06* (2009.01)
*H04W 48/16* (2009.01)
(Continued)

(52) U.S. Cl.
CPC ............. *H04W 4/06* (2013.01); *H04W 48/16* (2013.01); *H04W 48/18* (2013.01); *H04W 60/04* (2013.01)

(58) Field of Classification Search
CPC ....... H04W 4/06; H04W 48/16; H04W 48/18; H04W 60/04; H04W 80/10; H04W 76/40; H04W 76/12; H04L 67/141
See application file for complete search history.

(56) References Cited

U.S. PATENT DOCUMENTS 8,867,426 B2 10/2014 Chun et al.
10,524,166 B2 12/2019 Youn et al.
(Continued)

FOREIGN PATENT DOCUMENTS

CN 108990117 A 12/2018
CN 109155949 A 1/2019
(Continued)

OTHER PUBLICATIONS

Communication pursuant to Article 94(3) EPC dated Feb. 14, 2024, in connection with European Application No. 20858443.3, 6 pages.
(Continued)

*Primary Examiner* — Noel R Beharry
*Assistant Examiner* — Wilfred Thomas

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. According to the present disclosure, MBS services
(Continued)

for flexible and dynamic MBS service scenarios become possible in the next-generation wireless communication systems.

6 Claims, 12 Drawing Sheets

(51) Int. Cl.
H04W 48/18 (2009.01)
H04W 60/04 (2009.01)

(56) References Cited

U.S. PATENT DOCUMENTS

| | | | | |
|---|---|---|---|---|
| 10,582,565 | B2 * | 3/2020 | Yang | H04W 76/12 |
| 10,848,569 | B2 | 11/2020 | Zhu et al. | |
| 2019/0075511 | A1 | 3/2019 | Ryu et al. | |
| 2019/0158408 | A1 | 5/2019 | Li et al. | |
| 2019/0158985 | A1 * | 5/2019 | Dao | H04W 28/04 |
| 2019/0191467 | A1 * | 6/2019 | Dao | H04W 76/11 |
| 2019/0199802 | A1 * | 6/2019 | Zhu | H04W 76/19 |
| 2019/0223017 | A1 | 7/2019 | Lai et al. | |
| 2019/0223250 | A1 * | 7/2019 | Dao | H04W 72/23 |
| 2019/0313310 | A1 * | 10/2019 | Won | H04W 28/16 |
| 2020/0015131 | A1 * | 1/2020 | Ying | H04W 48/18 |
| 2020/0037376 | A1 * | 1/2020 | Hou | H04W 40/24 |
| 2020/0045753 | A1 * | 2/2020 | Dao | H04W 4/08 |
| 2020/0128450 | A1 * | 4/2020 | Wang | H04W 4/02 |
| 2020/0178141 | A1 * | 6/2020 | Lee | H04W 48/16 |
| 2020/0337093 | A1 * | 10/2020 | Kim | H04W 64/00 |
| 2020/0344576 | A1 * | 10/2020 | Li | H04W 4/06 |
| 2020/0396570 | A1 * | 12/2020 | Livanos | H04W 76/40 |
| 2021/0058467 | A1 * | 2/2021 | Zhu | H04W 24/04 |
| 2021/0168584 | A1 * | 6/2021 | Li | H04W 60/00 |
| 2022/0232460 | A1 * | 7/2022 | Fu | H04W 12/10 |

FOREIGN PATENT DOCUMENTS

| | | |
|---|---|---|
| CN | 109891962 A | 6/2019 |
| CN | 109995844 A | 7/2019 |
| CN | 110121194 A | 8/2019 |
| EP | 3821623 A1 | 5/2021 |
| WO | 2019136128 A1 | 7/2019 |
| WO | 2020029907 A1 | 2/2020 |

OTHER PUBLICATIONS

The First Office Action dated Nov. 30, 2023, in connection with Chinese Application No. 202080059683.1, 16 pages.
Supplementary European Search Report dated Aug. 10, 2023, in connection with European Patent Application No. 20858443.3, 10 pages.
Huawei et al., "KI#14: Update of Solution #B2," S2-1812278, SA WG2 Meeting #129bis, West Palm Beach, FL, USA, Nov. 26-30, 2018, 18 pages.
Samsung: "5G MBMS Procedure," S2-1810311, SA WG2 Meeting #129, Dongguan, China, Oct. 15-19, 2018, 12 pages.
International Search Report and Written Opinion of the International Searching Authority dated Nov. 27, 2020, in connection with International Application No. PCT/KR2020/011228, 10 pages.
AT&T, "Discussion on further revising FS_5MBS SID for Public Safety services," S2-1907133, 3GPP TSG SA WG2 Meeting #134, Sapporo, Japan, Jun. 24-28, 2019, 2 pages.
Notification of the Decision to Grant a Patent dated Sep. 24, 2024, in connection with Chinese Application No. 202080059683.1, 7 pages.
Communication pursuant to Article 94(3) EPC dated Feb. 4, 2025, in connection with European Patent Application No. 20858443.3, 7 pages.
Office Action dated Aug. 29, 2025, in connection with Korean Application No. 10-2019-0104061, 13 pages.
Tencent, "Discussion on Support of Edge Computing in 5G eV2X Broadcast", SA WG2 Meeting #129, S2-1810825, Oct. 2018, 5 pages.

* cited by examiner

Figure 4:
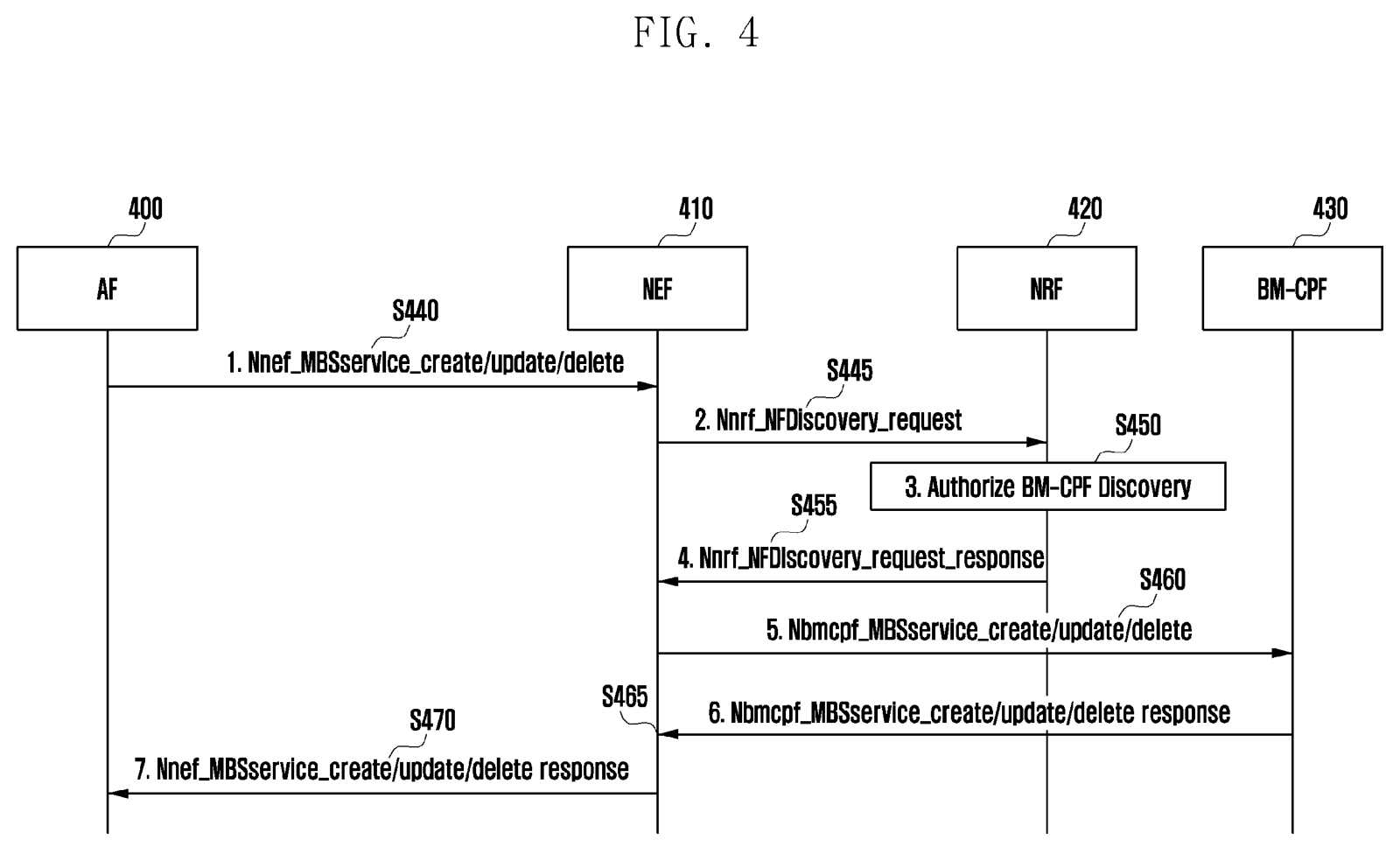

410 NEF

420 NRF

430 BM-CPF

S440 1. Nnef_MBSservice_create/update/delete

S445 2. Nnrf_NFDiscovery_request

S450 3. Authorize BM-CPF Discovery

S455 4. Nnrf_NFDiscovery_request_response

S460 5. Nbmcpf_MBSservice_create/update/delete

S465 6. Nbmcpf_MBSservice_create/update/delete response

S470 7. Nnef_MBSservice_create/update/delete response

NETWORK STRUCTURE AND SERVICE PROVIDING METHOD FOR SUPPORTING MULTICAST AND BROADCAST SERVICE IN MOBILE COMMUNICATION NETWORK

CROSS-REFERENCE TO RELATED APPLICATIONS

This application is a 371 National Stage of International Application No. PCT/KR2020/011228, filed Aug. 24, 2020, which claims priority to Korean Patent Application No. 10-2019-0104061, filed Aug. 23, 2019, the disclosures of which are herein incorporated by reference in their entirety.

BACKGROUND

1. Field

In order to transmit identical data to multiple terminals concentrated in a specific area in a mobile communication network, data may be transmitted through unicast to each terminal. However, for resource efficiency, data/service needs to be provided through multicast/broadcast. For example, there is a need for a method for transmitting data to multiple terminals concentrated in a specific area through multicast/broadcast for a TV/audio service, vehicle to everything communication (V2X) service, or massive cellular IoT (CIoT) service, and the disclosure relates to a network configuration scheme for supporting a multicast/broadcast service (MBS), by defining a network function (NF) or NF services therefor, exposing the corresponding NF or NF service, discovering the same, selecting the same, and the like.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, there has emerged a need to provide a service for transmitting identical data to multiple terminals in a next-generation wireless communication system.

SUMMARY

In order to transmit identical data to multiple terminals concentrated in a specific area in a mobile communication network, there is a need to provide data/service through multicast/broadcast. For example, there is a need for a method for transmitting data to multiple terminals concentrated in a specific area through multicast/broadcast for a TV/audio service, V2X service, or massive CIoT service, and the disclosure relates to a network configuration scheme for supporting a multicast/broadcast service (MBS), by defining a network function (NF) or NF services therefor, exposing the corresponding NF or NF service, discovering the same, selecting the same, and the like.

In general, a broadcast multicast service center (BM-SC) and a MBMS-GW are introduced to a core network in an LTE network, and a multi-cell/multicast coordination Entity (MCE) are introduced to E-UTRAN, thereby supporting a multicast/broadcast service. Meanwhile, there is a need for an MBS network configuration scheme for 5GS for supporting a multicast/broadcast service for 5GS, improving flexibility in connection with deployment and operation, and dynamically adjusting the multicast/broadcast service. The disclosure introduces a scheme for service exposure for NF or NF services for supporting an MBS service, and discovery and selection regarding the NF or NF service.

According to an embodiment of the disclosure, a method for controlling a first entity in a wireless communication system may include receiving information on data traffic of a session of a multicast/broadcast service (MBS); receiving Internet protocol (IP) address information of a second entity; generating context information for management of the MBS session; and establishing a control session with regard to the second entity based on the IP address information of the second entity and the context information.

Meanwhile, a first entity in a wireless communication system may include a transceiver and a controller configured to control the transceiver to receive information on data traffic of a session of a multicast and broadcast service (MBS) and receive Internet protocol (IP) address information of a second entity, generate context information for management of the MBS session, and perform control to establish a control session for the second entity based on the IP address information of the second entity and the context information.

The disclosure enables an MBS service regarding a flexible and dynamic MBS service scenario in 5GS.

BRIEF DESCRIPTION OF THE DRAWINGS

Figure 1A:
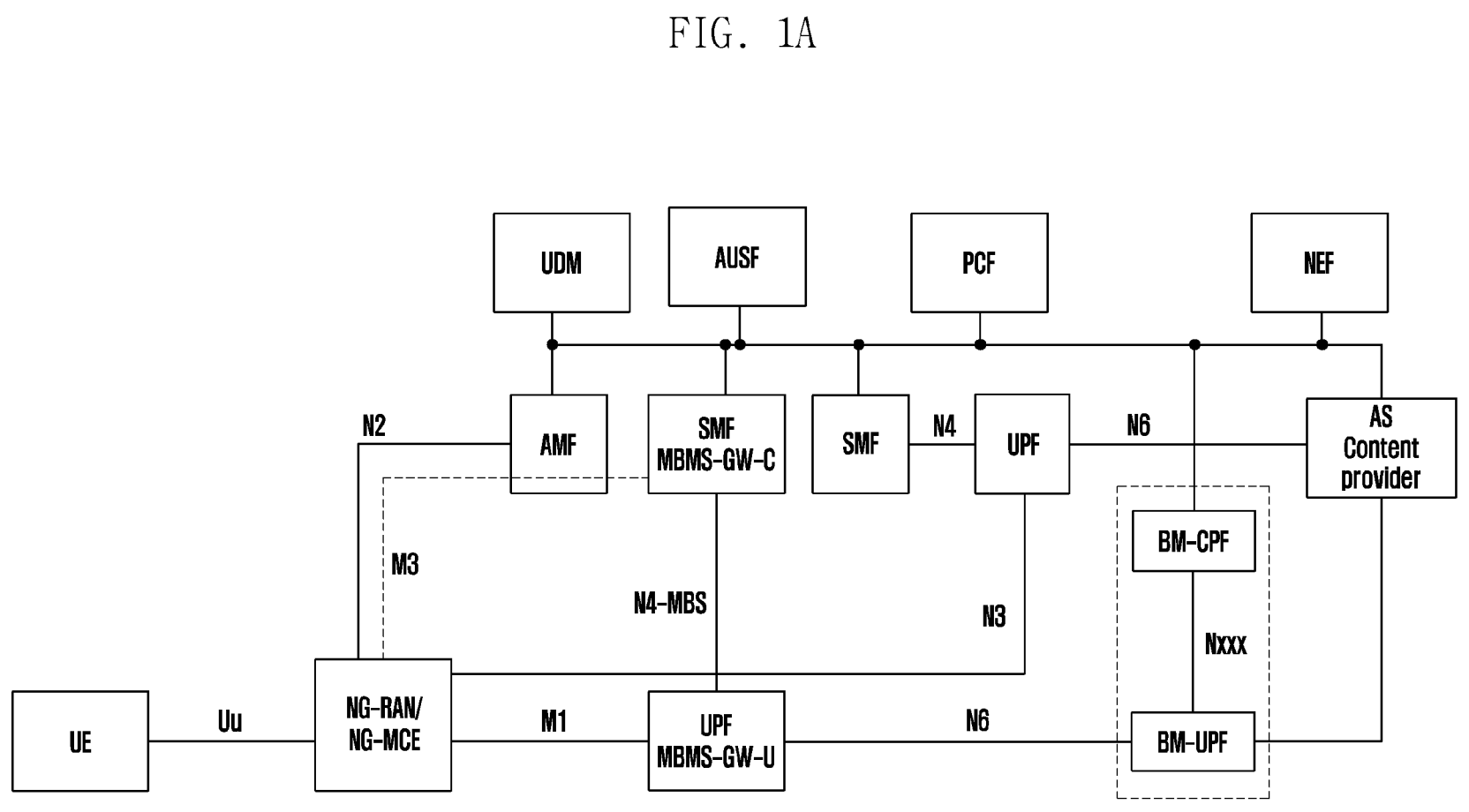

FIGS. 1A and 1B illustrate a 5GS structure for MBS according to an embodiment of the disclosure;

FIG. 4 illustrates a process in which an AF (an AS or contents provider) selects an appropriate BM-CPF to provide an MBS service according to an embodiment of the disclosure;

DETAILED DESCRIPTION

Figure 1B:
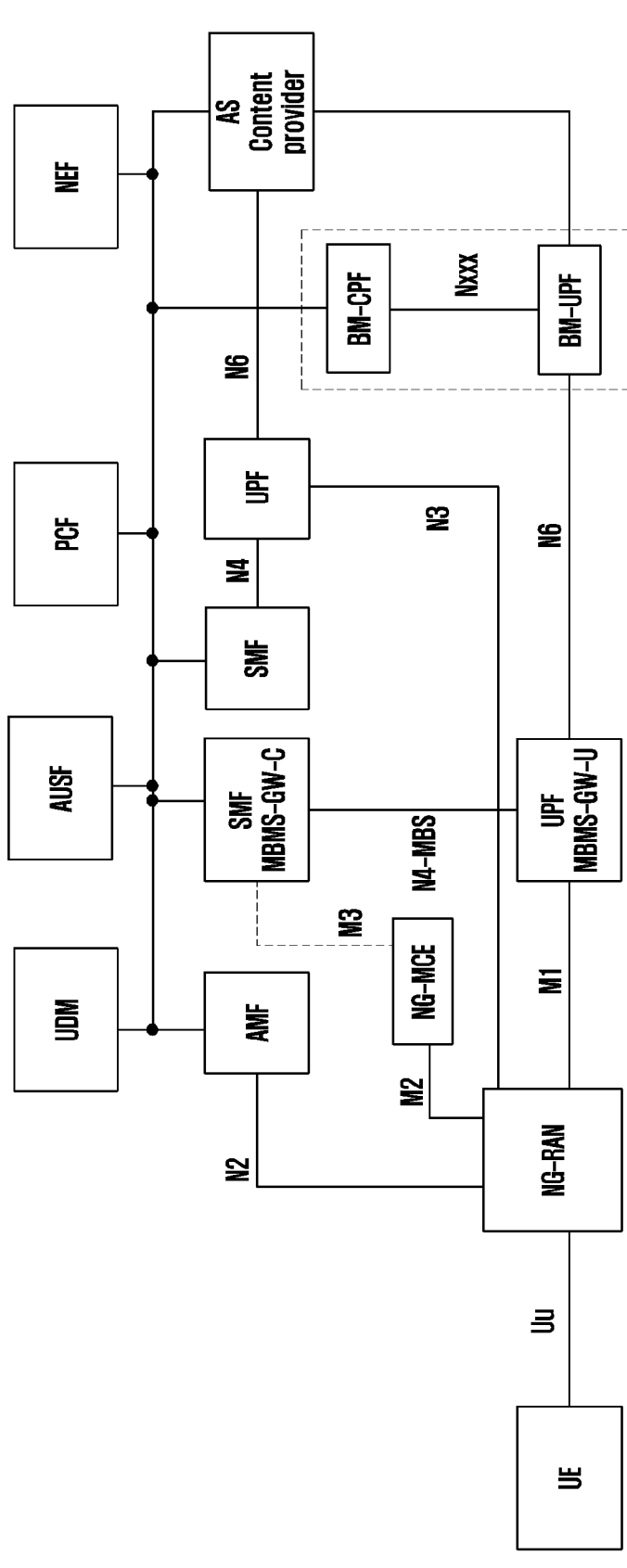

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit".

Moreover, the elements and "units" or may be implemented to reproduce one or more CPUs within a device or a security multimedia card. Further, the "unit" in the embodiments may include one or more processors.

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification. In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Of course, examples of the base station and the terminal are not limited thereto. The following description of the disclosure is directed to technology for receiving broadcast information from a base station by a terminal in a wireless communication system. The disclosure relates to a communication technique for converging IoT technology with a 5th generation (5G) communication system designed to support a higher data transfer rate beyond the 4th generation (4G) system, and a system therefor. The disclosure may be applied to intelligent services (e.g., smart homes, smart buildings, smart cities, smart cars or connected cars, healthcare, digital education, retail business, security and safety-related services, etc.) on the basis of 5G communication technology and IoT-related technology.

As used in the following description, terms referring to broadcast information, terms referring to control information, terms related to communication coverage, terms referring to state changes (e.g., events), terms referring to network entities, terms referring to messages, terms referring to device elements, and the like are illustratively used for the sake of convenience. Therefore, the disclosure is not limited by the terms as used below, and other terms referring to subjects having equivalent technical meanings may be used.

As used in the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description of the disclosure, terms and names defined in the 5G system standards will be used for the convenience of description. However, the disclosure is not limited by these terms and names, and may be applied in the same way to systems that conform other standards.

First, FIGS. 1A and 1B illustrate a structure of a cellular system for MBS service, for example, a structure of 5GS according to an embodiment of the disclosure.

In order to support MBS service in 5GS, a cellular system for MBS is configured with the following network functions and services.

In case that an application server, for example, a V2X application server or CIoT application server, or MCPTT application or contents provider, for example, a TV or audio service provider, a streaming video service provider, and the like requests an MBS service, the cellular system may include a broadcast/multicast-control plane function (BM-CPF), which is a network function for managing the corresponding MBS service session and controlling the corresponding MBS service traffic, and a broadcast/multicast-user plane function (BM-UPF), which is an MBS service media anchor in 5GS for receiving media from the AS or contents provider and processing media traffic under the control of the BM-CPF. An interface between the BM-CPF and BM-UPF is referred to as an Nxxx interface. The BM-CPF and BM-UPF may be integrated into one entity or one NF. For example, the BM-CPF may be a first entity, and the BM-UPF may be a second entity.

Through the BM-CPF and BM-UPF, an MBS session may be managed and service traffic may be generated. When the service traffic is transferred to a terminal through multicast/broadcast, the corresponding traffic may be managed by performing allocation of an MBS PDU session. A control function or service for generating an MBS context for the MBS PDU session, managing the MBS PDU session, and transferring the traffic of the MBS PDU session to an NG-RAN through IP multicast is collectively called a multimedia broadcast-multicast service gateway-control plane (MBMS-GW-C) service. The MBMS-GW-C service may be integrated into an existing SMF for managing a unicast PDU session and configured as an SMF having an MBS PDU session control function, or may be configured as a separate NF. The NF separately configured only with the MBMS-GW-C service is referred to as a multicast/broadcast session management function (MB-SMF) in this document.

In addition, a service for transferring traffic, which is received from the BM-UPF according to the MBS context for the MBS PDU session, to an NG-RAN, which performs multicast/broadcast according to the MBMS-GW-C service, through IP multicast is collectively referred to as a multimedia broadcast-multicast service gateway-user plane (MBMS-GW-U) service. The MBMS-GW-U service may be integrated into an existing UPF for performing processing of the unicast PDU session and configured as a UPF having a function of transferring MBS traffic to an appropriate NG-RAN through IP multicast, or may be configured as a separate NF. The NF, which is separately configured only with the MBMS-GW-U service, is referred to as a multicast/broadcast user plane function (MB-UPF) in this document.

The MBMS-GW-C service uses an N4-MBS interface to control the MBMS-GW-U service.

In describing an embodiment of the disclosure, the MBMS-GW-C and MBMS-GW-U are mainly described as SMF and UPF, respectively, for convenience, but if necessary, whether the use thereof is for unicast or multicast/broadcast, or whether or not both are supported is also described in order to avoid confusion.

The MBS session traffic is transferred from the MBMS-GW-U (or UPF or MB-UPF) to NG-RANs. For example, the MBS session traffic is transferred to the NG-RAN using IP multicast. Here, a tunnel between the MBMS-GW-U (or UPF or MB-UPF) and NG-RANs is called an M1 tunnel.

In order to establish the M1 tunnel, the MBMS-GW-C (or SMF or MB-SMF) transmits a control message to the NG-RAN through a next generation-multicell coordination entity (NG-MCE) or directly transmits the control message to the NG-RAN.

Here, communication with the MBMS-GW-C may be performed through an AMF having an M3 connection with the NG-MCE or NG-RAN as shown in FIG. 1A. Alternatively, as shown in FIG. 1B, the MBMS-GW-C may directly transfer a control message to an appropriate NG-MCE through an M3 connection, and the NG-MCE may transfer the received control message of the MBMS-GW-C to NG-RANs through an M2 connection. Alternatively, the MBMS-GW-C may directly transmit a control message to the NG-RAN through an M3 connection.

According to an embodiment of the disclosure, the MBS service is performed through the following procedure. First, when a terminal is notified that the MBS service is available, terminals desiring to receive a service may perform service registration, if necessary, for the MBS service, and may perform a procedure of acquiring related parameters required for receiving the service.

Meanwhile, in 5GS, a signaling procedure for generating a session for transferring MBS data and generating and managing a tunnel for transmitting the MBS data from an MBS service provider or an application server (AS) to a base station in a corresponding region may be performed.

When the MBS data arrives to a base station through the tunnel, the base station broadcasts information indicating that there is MBS data to be transmitted and that when/how MBS data transmission occurs so as to allow terminals that have acquired MBS service parameters to know the information, and broadcasts the MBS data according to the information.

When the MBS service is no longer performed, the generated session may be released and the tunnel allocated for the service may be removed.

Figure 2:
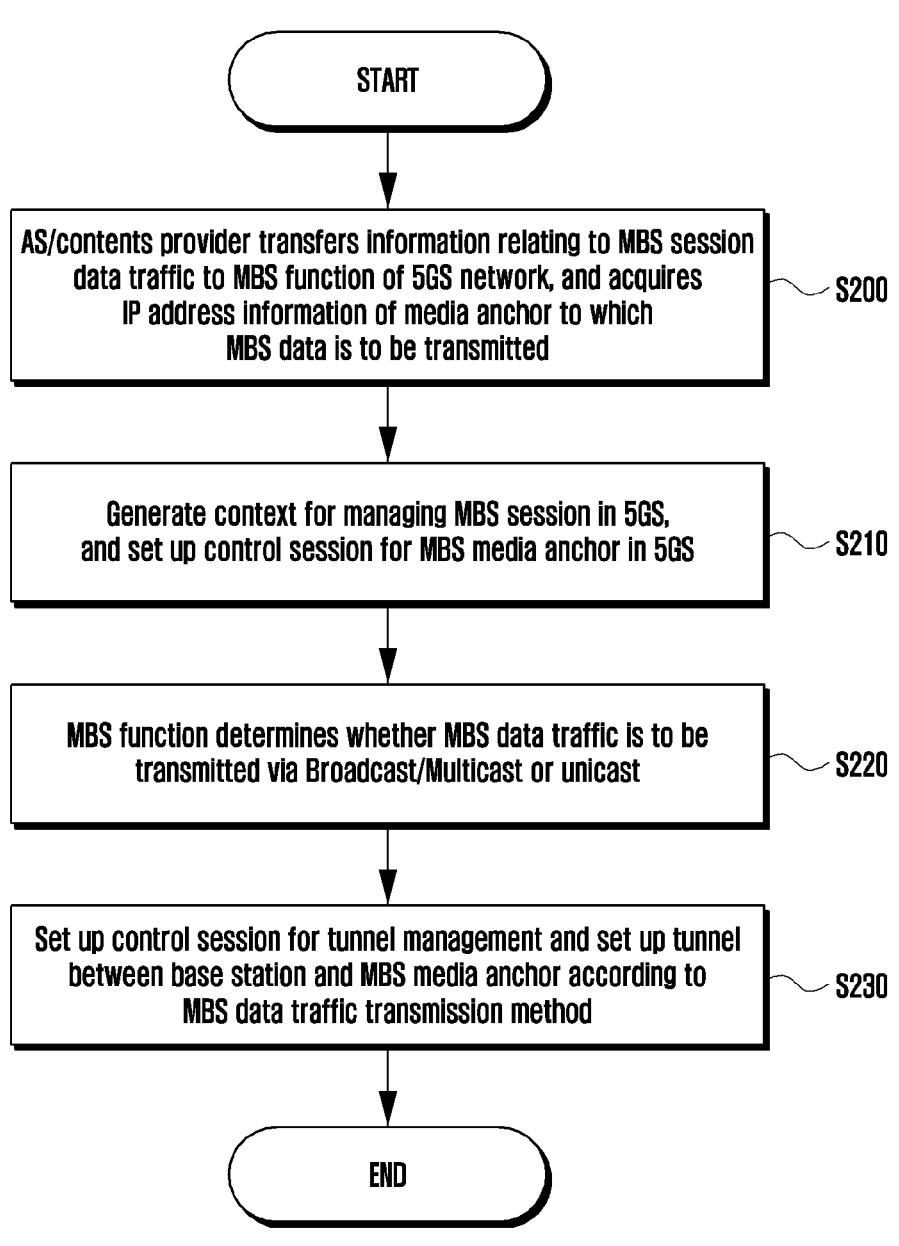
FIG. 2 illustrates a process of generating an MBS session according to an embodiment of the disclosure.

FIG. 2 illustrates a process for starting an MBS session in a 5G network according to an embodiment of the disclosure.

In operation S200, an application server (AS) or MBS contents provider may transfer information relating to MBS session data traffic to an MBS function of the 5GS network in order to transfer the MBS data traffic through 5GS, and may acquire IP address information of a media anchor in 5GS to which MBS data is to be transmitted. For example, the MBS function may be a BM-CPF, or an SMF or BMSC including an MBS service session management function, as a first entity. In addition, the media anchor may be a BM-UPF, or an UPF or BMSC including a media source function for a BM-UPF or MBS service session, as a second entity.

The role of MBS function may be performed by a broadcast multicast-control plane function (BM-CPF), a session management function (SMF) having an MBS service session management function added thereto, a broadcast multicast service center (BMSC), or the like, for example.

In addition, the role of media anchor in the 5GS may be performed by a broadcast multicast-user plane function (BM-UPF), a user plane function (UPF) having a media source function for an MBS service session added thereto, a broadcast multicast service center (BMSC), or the like, for example.

In operation S210, the MBS function generates an MBS context for managing an MBS service session in 5GS, and sets up a control session for an MBS media anchor in 5GS. For example, the BM-CPF may generate an MBS context and set up a control session for an MBS media anchor in 5GS.

In operation S220, the MBS function determines whether MBS data traffic transmission is to be performed via broadcast, multicast, or unicast. The transmission method may be determined according to the density of terminals receiving the MBS session service, e.g., how many terminals will receive services in an area to which service will be broadcast/multicast, or may be determined according to whether a base station, in which terminals receiving the MBS session service are located, has the MBS function.

In operation S230, when it is determined that transmission of the MBS data traffic occurs via broadcast/multicast, a tunnel may be generated between base stations, which are located in an area to which the MBS data traffic is to be broadcasted, and a media anchor. The tunnel between the media anchor and the base stations includes a tunnel between the media anchor and UPF for broadcast/multicast, and a tunnel between the UPF for broadcast/multicast and base stations located in an area to which data traffic is to be broadcast. The MBS function sets up a control session for managing the tunnel between the media anchor and the UPF for broadcast/multicast. In addition, the MBMS-GW-C (or SMF or MB-SMF) sets up a control session for managing the tunnel between the UPF for broadcast/multicast and base stations located in an area to which data traffic is to be broadcast.

For example, a tunnel may be generated between the BM-UPF and the NG-RAN. The tunnel may include a first tunnel between the BM-UPF and the MBMS-GW-U service and a second tunnel between the MBMS-GW-U service and the NG-RAN. The BM-CPF may set up a control session for managing the first tunnel. In addition, the MBMS-GW-C may set up a control session for managing the second tunnel.

Meanwhile, when the BM-UPF serving as the media anchor and the UPF for broadcast/multicast, for example, the MB-UPF are implemented as one entity, the two tunnels may be configured as one and managed. Accordingly, the MBS function and the MBMS-GW-C may be configured as one and thus set up a control session for managing the tunnel between the media anchor and the base stations.

On the other hand, when it is determined that transmission of the MBS data traffic occurs via unicast, the MBS function may allow the corresponding terminal to generate a PDU session for a data network (DN) for the MBS service, and may generate a tunnel between a media anchor and a base station to which the terminal is connected, between the base station and a UPF to which a media source function is added, or between the base station and a UPF for MBS.

In describing an embodiment of the disclosure, the MBS function and service of 5GS may be referred to as BM-CPF. However, the MBS function and service may exist in the SMF or may exist as a BM-SC together with a user plane. In addition, the media anchor of 5GS is called BM-UPF. However, the media anchor may exist in the UPF, or may exist as a BM-SC together with a control plane.

The BM-CPF may make service announcement for MBS service in 5GS, manage MBS user service sessions, determine whether to transmit MBS data via broadcast/multicast or unicast, or manage BM-UPF which is a media anchor, and thus may receive MBS data from the AS or MBS contents provider and control the transmission of MBS data through 5GS.

In order to provide an MBS service according to an embodiment of the disclosure, a method for exposing the MBS function and service of 5GS out of the 5GS network, and discovering and selecting an appropriate MBS function and service by an application server (AS) or MBS contents provider is required.

To this end, it is necessary to register the MBS function and service in a network repository function (NRF) and a network exposure function (NEF), and to support other network functions (NFs) or application functions (AFs) to discover and select the MBS function and service.

Figure 3:
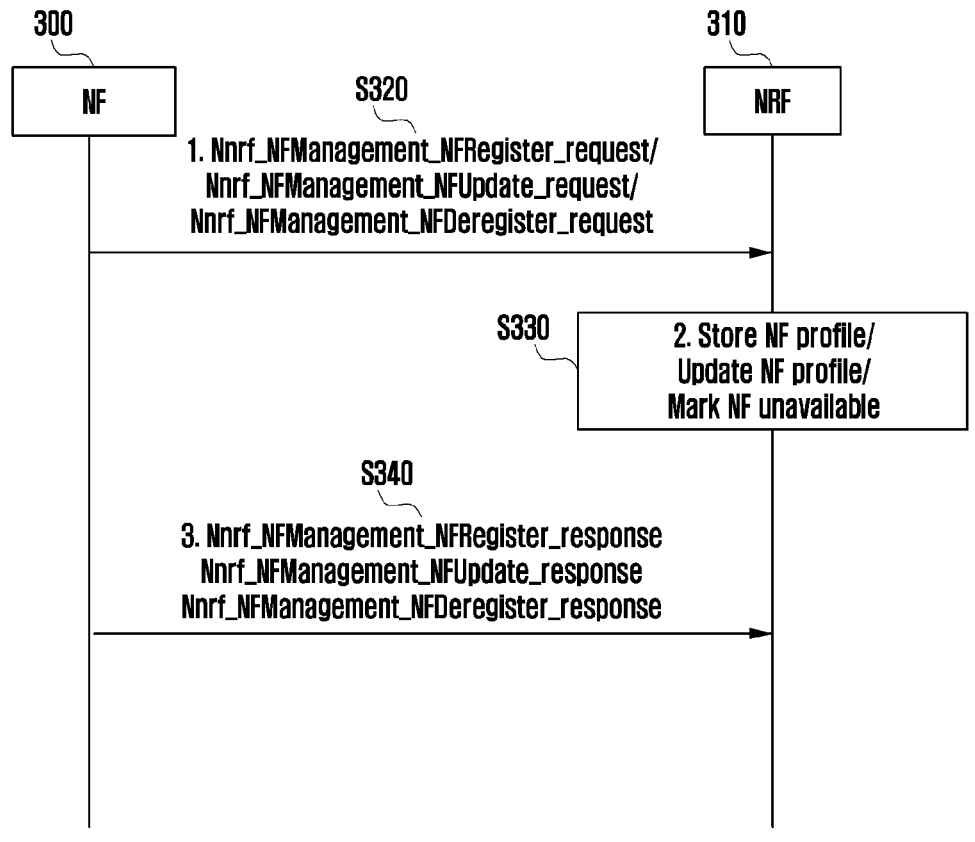
FIG. 3 illustrates a process of registering a profile in an NRF by MBS-related entities according to an embodiment of the disclosure.

FIG. 3 illustrates a process in which a network function (NF) 300 registers, updates, or deregisters a profile in an NRF 310 in order to provide an MBS service according to an embodiment of the disclosure.

The NF 300 may request registration of information required for a service for provision as well as information relating to an NF type, an NF instance ID, an NF service name for provision, and a PLMN ID from the NRF 310 through a Nnrf_NFManagement_NFRegister_request message (operation S320). In addition, the NRF 310 may store a profile of the NF 300 (operation S330), and may notify the NF 300 of the registration of the NF profile through the Nnrf_NFManagement_NFRegister_response message (operation S340).

In addition, when updating the NF profile itself, the NF 300 requests the NRF to update the profile of the NF 300 including information of a service to be changed together with the NF instance ID or information of a service for change through an Nnrf_NFManagement_NFUpdate_request message (operation S320). In addition, the NRF 310 may update the profile (operation S330), and may provide notification of an update result to the NF 300 through an Nnrf_NFManagement_NFUpdate response message (operation S340).

In addition, when the NF 300 does not provide its own service, the NF may request deregistration from the NRF 310 through an Nnrf_NFManagement_NFDeregister_request message, together with the NF instance ID and the reason thereof (step S320). After performing deregistration processing, the NRF 310 may provide update of the state of the NR 300 as unavailable for the NRF 310 (step S330), and may notify the NF 300 of the update result through Nnrf_NFManagement_NFDeregister_response (operation S340).

Here, the NF 300 may be a BM-CPF, BM-UPF, SMF, UPF, or AMF as an NF for MBS service. Service-related information, which is registered/updated/deregistered in a profile of each NF, will be explained.

First, when the NF 300 is a BM-CPF, information required for service registration in the NRF 310, which enables an application function (AF), an application server (AF), or a contents provider to select an appropriate BM-CPF to provide the MBS service, may include NF type=BM-CPF, an NF instance ID, an NF service name for provision (e.g., Nbmcpf_MBSservice, etc), and a service ID indicating the type of MBS service that can be supported by the BM-CPF, together with a PLMN ID, for example, a TV service, a video service, a radio service, an IoT service, a V2X service, and a public safety service. Alternatively, the information required for service registration may include information including more detailed service information, for example, a service ID indicating a channel x TV service, a police network service among public safety services, a firefighter network service among public safety services, and an IoT service for subscribers of a specific company. In addition, the information may include MBS service coverage that can be supported by the BM-CPF, for example, an MBS service area, or a part or all of a TAI list, or a cell ID list. In addition, the information may include a broadcast group ID list, which is a list of groups of terminals capable of receiving a service, for example, a range of a corresponding TMGI or a TMGI list. In addition, the information may include information such as DNN and network slice info (e.g., S-NSSAI, NW slice instance ID) that can be supported by the BM-CPF.

A method of discovering and selecting an appropriate BM-CPF by using pieces of information stored in the profile of the BM-CPF of the NRF 310 is described in another embodiment.

Meanwhile, when the NF 300 is BM-UPF, information required for service registration in the NRF 310, which allows the BM-CPF to select an appropriate BM-UPF, in order for 5GS to receive MBS traffic provided by an application function (AF), an application server (AF), or a contents provider to provide a role as a media anchor in 5GS, may include NF type=BM-UPF, an NF instance ID, an NF service name for provision (e.g., Nbmupf_MBSservice, etc), and a service ID indicating the type of MBS service that can be supported by the BM-UPF, together with a PLMN ID, for example, a TV service, a video service, a radio service, an IoT service, a V2X service, and a public safety service. Alternatively, the information may include information including more detailed service information, for example, a service ID indicating a channel x TV service, a police network service among public safety services, a firefighter network service among public safety services, and an IoT service for subscribers of a specific company. In addition, the information may include MBS service coverage that can be supported by the BM-UPF, for example, an MBS service area, or a part or all of a TAI list, a cell ID list, or DNAI. In addition, the information may include a broadcast group ID list, which is a list of groups of terminals capable of receiving a service, for example, a range of a corresponding TMGI or a TMGI list. In addition, the information may include information such as network slice info (e.g., S-NSSAI, NW slice instance ID) that can be supported by the BM-UPF.

A method in which the BM-CPF discovers and selects an appropriate BM-UPF by using pieces of information stored in the profile of the BM-UPF of the NRF 310 is described in another embodiment.

When the NF 300 is an SMF, information required for service registration in the NRF 310, which enables the BM-CPF to manage the MBS session and select an SMF suitable for performing control such as generation/modification/deregistration of a tunnel through which the corresponding MBS traffic is transmitted, may include NF type=SMF, an NF instance ID, an NF service name for provision (e.g., Nsmf_PDUSession, Nsmf_Multicast&BroadcastPDUSession, etc.), and a service ID indicating, together with a PLMN ID, whether the SMF can support IP multicast, whether the SMF can support a broadcast/multicast transmission method, whether the SMF can support a unicast transmission method, an IP version that can be supported, and the type of MBS service that can be supported by the SMF, for example, a TV service, a video service, a radio service, IoT service, a V2X service, and a public safety service. Alternatively, the information may include information including more detailed service information, for example, a service ID indicating a channel x TV service, police network service among public safety services, a firefighter network service among public safety services, an IoT service for subscribers of a specific company. In addition, the information may include MBS service coverage that can be supported by the SMF, for example, an MBS service area, or a part or all of a TAI list, a cell ID list, or DNAI. In addition, the information may include a broadcast group ID list, which is a list of groups of terminals capable of receiving a service, for example, a range of a corresponding TMGI or a TMGI list. In addition, the information may include information such as network slice info (e.g., S-NSSAI, NW slice instance ID) that can be supported by the SMF. In addition, the information may include information such as network slice info (e.g., S-NSSAI, NW slice instance ID) that can be supported by the SMF. In addition, the information may include information relating to whether the SMF supports switching and steering functions between a broadcast/multicast transmission method and a unicast transmission method.

A method of discovering and selecting an appropriate SMF by using pieces of information stored in the profile of the SMF of the NRF 310 is described in another embodiment.

When the NF 300 is UPF, information required for service registration in the NRF, which enables the SMF to select an appropriate UPF corresponding to one end of a tunnel through which MBS traffic is transmitted according to a MBS session, may include NF type=UPF, an NF instance ID, an NF service name for provision (e.g., Nupf_PDUSession, Nupf_Multicast&BroadcastPDUSession, etc.), and together with a PLMN ID, whether the UPF can support IP multicast, whether the UPF can support a broadcast/multicast transmission method, whether the UPF can support a unicast transmission method, IP version that can be supported, MBS service coverage that can be supported by the UPF, for example, a MBS service area, or a part or all of a TAI list, a cell ID list, or DNAI. In addition, the information may include information such as network slice info (for example, S-NSSAI, NW slice instance ID) that can be supported by UPF. In addition, the information may include information relating to whether the UPF supports switching and steering functions between a broadcast/multicast transmission method and a unicast transmission method.

A method of discovering and selecting an appropriate UPF by using pieces of information stored in the profile of the UPF of the NRF is described in another embodiment.

When the NF 300 is AMF, information required for service registration in the NRF 310, which enables an SMF for controlling and managing a tunnel, through which the corresponding MBS traffic is transmitted according to a MBS session, to select an appropriate AMF to relay a control message between the SMF and the NG-RAN (e.g., NG-multicell coordination entity (MCE), eNB, or gNB) in order to transmit QoS/Policy information and the like for the tunnel establishment and the MBS traffic to the NG-RAN, which is one end of the tunnel, may include NF type=AMF, an NF instance ID, an NF service name for provision (e.g., Namf_Communication_N1N2MessageTransfer, Namf_Communication_M3 MessageTransfer, etc.), whether an M3 interface which is an interface for MBS with NG-MCE or NG-RAN is setup by the AMF, together with a PLMN ID, GUAMI information of the AMF, MBS service coverage that can be supported by the AMF, for example, a MBS service area, or a part or all of a TAI list or a cell ID list. In addition, the information may include information such as network slice info (e.g., S-NSSAI, NW slice instance ID) that can be supported by the AMF.

A method of discovering and selecting an appropriate AMF by using pieces of information stored in the AMF profile of the NRF 310 is described in another embodiment.

When the NF 300 is an NG-MCE, information required for service registration in the NRF, which enables an SMF for controlling and managing a tunnel, through which the corresponding MBS traffic is transmitted according to a MBS session, to select an appropriate NG-MCE when the SMF directly transmits a control message to the NG-MCE or NG-RAN in order to transmit QoS/Policy information and the like for the tunnel establishment and the MBS traffic to the NG-RAN, which is one end of the tunnel, may include NF type=NG-MCE, an NF instance ID, an NF service name for provision (e.g., Nmce_Communication_M3 MessageTransfer, etc.), a list of NG-RANs to which the NG-MCE is connected through M2, which is an interface for MBS, together with a PLMN ID, MBS service coverage that can be supported by the NG-MCE, for example, a MBS service area, or a part or all of a TAI list or a cell ID list. In addition, the information may include information such as network slice info (e.g., S-NSSAI, NW slice instance ID) that can be supported by the NG-MCE.

A method of discovering and selecting an appropriate NG-MCE by using pieces of information stored in the profile of the NG-MCE of the NRF 310 is described in another embodiment.

Meanwhile, FIG. 4 illustrates a process of selecting an appropriate BM-CPF 430 in order to provide an MBS service by an AF 400, for example, an AS or a contents provider, according to an embodiment of the disclosure.

The AF 400 may include information for MBS service in a Nnef_MBSservice_create request message and transmit the message to an NEF410 which exposes MBS service capacity to provide the MBS service (operation S440). The information for the MBMS service may include information on a service type. Specifically, the information for the MBS service may include a service ID indicating the type of MBS service, such as a TV service, a video service, a radio service, an IoT service, a V2X service, a public safety service, or more detailed service information. For example, the detailed service information may include a service ID indicating a channel x TV service, a police network service among public safety services, a firefighter network service among public safety services, and an IoT service for a subscriber of a specific company. In addition, the information may include MBS service coverage in which the MBS service is performed, for example, a MBS service area, or a part or all of a TAI list, a cell ID list, or area information of an actual map. In addition, the information may include a broadcast group ID list, which is a list of groups of terminals capable of receiving a service, for example, a range of a corresponding TMGI or a TMGI list. In addition, characteristics of traffic generated due to the MBS service, for example, all or part of 5QI, a resource type (e.g., GBR, delay critical GBR, or non-GBR), maximum bit rate, guaranteed bit rate, maximum delay tolerance, maximum packet loss rate, priority level, and the maximum data burst volume may be included as QoS information.

Upon receiving the message, the NEF 410 may transmit an Nnrf_NFDiscovery_Request request message to an NRF 420 in order to select an appropriate BM-CPF 430 (operation S445). Here, the Nnrf_NFDiscovery_Request request message may include target NF service=Nbmcpf_MBSservice, NF type of target NF=BM-CPF, NF type of NF service consumer=AF, and ID information of the AF 400. In addition, the Nnrf_NFDiscovery_Request request message may include the MBS service ID received from the AF 400, MBS service coverage, and a part or all of the information on a list of groups of terminals capable of performing service reception. In addition, the Nnrf_NFDiscovery_Request request message may include corresponding network slice info (for example, S-NSSAI) received from the AF 400 or found through information received from the AF 400.

If the AF 400 belongs to a trusted domain of the 5GS, the AF 400 may request discovering an appropriate BM-CPF 430 by directly transmitting the Nnrf_NFDiscovery_Request request message to the NRF 420 without going through the NEF 410.

Upon receiving the message, the NRF 420 may identify that the BM-CPF discovery is allowed for the NF or AF (operation S450). In addition, the NRF 420 may search for/discover a suitable BM-CPF from the profiles of the BM-CPF registered in the NRF 420, and may transfer information of the discovered BM-CPF(s) to the NEF 410 through an Nnrf_NFDiscovery_Request response message (operation S455). As a method for searching for/discovering the appropriate BM-CPF 430, the NRF 420 may find a profile of the BM-CPF 430, which is determined to be the most consistent with all or part of the information included in the Nnrf_NFDiscovery_Request request message. The information of BM-CPF(s) included in the Nnrf_NFDiscovery_Request response message may include NF type=BM-CPF, an NF instance ID, FQDN or IP address(es) of the NF instance, and a list of services instances. In addition, the information of BM-CPF(s) may include a part or all of NF load information or MBS service ID of the BM-CPF(s), MBS service coverage, TAI list, PLMN ID, and S-NSSAI(s).

The NEF 420 may transmit an MBS service request, which is requested by the AF 400, to the selected BM-CFP(s) among the discovered BM-CPF(s) through an Nbmcpf_MBSservice_create request message (operation S460). In addition, in response thereto, the NEF 420 may receive an Nbmcpf_MBSservice_create response message from the BM-CPF(s) (operation S465). The Nbmcpf_MBS-service_create response message may include information on the NF, which the BM-CPF 430 uses as a media anchor within 5GS, for example, information of a FQDN or IP address of the BM-UPF. In addition, the Nbmcpf_MBSservice_create response message may include information on a transmission method for the MBS service selected by the BM-CPF 430.

If the existing MBS service has not been performed in a process of transmitting the information for MBS service to the NEF 410, which exposes the MBS service capability to provide the MBS service, the AF 400 may include the information for MBS service in the Nnef_MBSservice_create request message and transmit the same, as described above, to allow the BM-CPF 430 to newly generate the MBS service. However, if the existing MBS service is being performed, the information for the existing MBS service is transmitted through the Nnef_MBSservice_update request message in operation S440, and the corresponding BM-CPF 430 may request update of the existing MBS service. Alternatively, the corresponding BM-CPF 430 may request deletion of the existing MBS service through the Nnef_MBS-service_delete request message, and may perform the update request or delete request according to the request through operations S460, S465, and S470.

As shown in FIG. 4, when the AF 400 belongs to a trusted domain of 5GS in a process of selecting an appropriate BM-CPF 430 by the AF (AS or contents provider) 400 to provide the MBS service, the AF 400 may directly transmit the message, which is transmitted in operation S445, to the NRF 420 without going through the NEF 410, instead of transmitting the message, which is transmitted in operation S440. In addition, as a response thereto, the NRF 420 may directly transmit the message, which is transmitted in operation S455, to the AF 400 so as to enable the AF 400 to directly select an appropriate BM-CPF 430 based on the response of the NRF 420. Here, the AF 400 may omit operations S440 and S470 and discover/select the BM-CPF 430 through operations S445, S450, and S455. In addition, the AF 400 may directly request the MBS service through the BM-CPF 430 through operations S460 and S465.

In addition, in a case of using service communication proxy (SCP) in 5GS, if transmission of the messages to the SCP occurs instead of directly transmitting messages among the AF 400, NEF 410, or BM-CPF 430, messaging between NFs may occur in a method of searching for/discovering a destination, by the SCP, based on information which the NRF 420 or the SCP itself has, and transferring the message to the appropriate NF to allow processing thereof.

Figure 5:
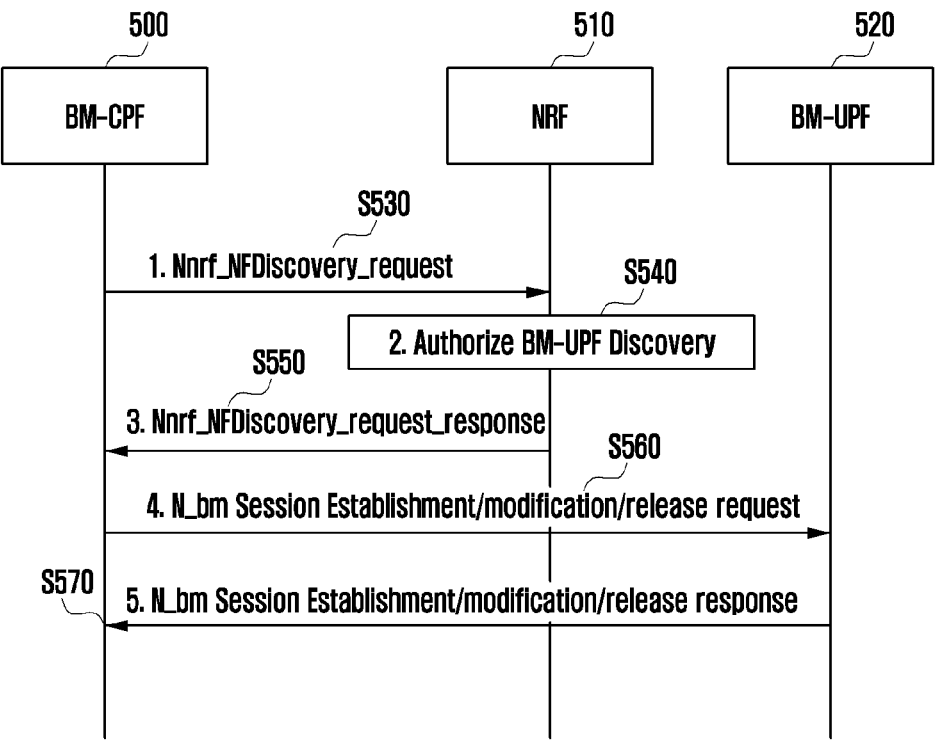
FIG. 5 illustrates a process in which a BM-CPF selects an appropriate BM-UPF to provide an MBS service according to an embodiment of the disclosure.

Meanwhile, FIG. 5 illustrates a process in which a BM-CPF 500 selects an appropriate BM-UPF 520 to provide an MBS service according to an embodiment of the disclosure.

In order to select an appropriate BM-UPF 520, the BM-CPF 500 transmits an Nnrf_NFDiscovery_Request request message to an NRF 510 in operation S530. Here, the Nnrf_NFDiscovery_Request request message may include target NF service=Nbmupf_MBSservice, NF type of target NF=BM-UPF, PLMN ID, MBS service ID indicating the type of MBS service that BM-CPF desires to provide, MBS service coverage in which service is to be performed, for example, a MBS service area, or a part or all of a TAI list, a cell ID list, or DNAI, and a broadcast group ID list, which is a list of groups of reception terminals targeting a service, for example, a range of a corresponding TMGI or a TMGI list. Alternatively, the message may include a part or all of information such as network slice info (e.g., S-NSSAI, NW slice instance ID) to which the BM-CPF 500 belongs.

Upon receiving the message, the NRF 510 may identify that the BM-UPF discovery is allowed for the NF (operation S540). In addition, the NRF 510 may search for/discover an appropriate BM-UPF 520 from the profiles of the BM-UPF 520 registered in the NRF 510, and may transfer information of the discovered BM-UPF(s) to the BM-CPF 500 through the Nnrf_NFDiscovery_Request response message (operation S550). A method of searching for/discovering the appropriate BM-UPF 520 may be a method of finding the profile of the BM-CPF, which is determined to be the most consistent with all or part of the information, which is transmitted by including in the Nnrf_NFDiscovery_Request request message. The information of BM-UPF(s) included in the Nnrf_NFDiscovery_Request response message may include NF type=BM-UPF, NF instance ID, FQDN or IP address(es) of the NF instance, and a list of services instances. In addition, the information of BM-UPF(s)the may include a part or all of NF load information or MBS service ID of the BM-UPF(s), MBS service area, TAI list, PLMN ID, S-NSSAI(s), and DNAI.

The BM-CPF 500 may transfer an Nbm_Session_Establishment request message to the selected BM-UFP (s) among the discovered BM-UPF(s) (operation S560). The BM-UPF 520 may transmit an Nbm_Session_Establishment response message to the BM-CPF 500 in response to the request while establishing a control session for controlling MBS service session traffic between the BM-CPF 500 and the BM-UPF 520 (operation S570). The Nbm_Session_Establishment response message may include information on an NF, which is used as a media anchor in SGS, for example, FQDN or IP address of the BM-UPF.

As described above, when a control session between the BM-CPF 500 and the BM-UPF 520 is not established, a new session is established by exchanging Nbm_Session_Establishment request/response messages as in operations S560 and S570. However, if the BM-CPF 500 already has a control session with the BM-UPF 520, update of the existing MBS service is requested through a Nbm_Session_modification request message, or the corresponding BM-CPF may request release of the existing control session through a Nbm_Session_release request message, in operation S560.

In addition, the update request or release request may be performed through operation S570 according to the request.

In a case of using service communication proxy (SCP) in 5GS, if the BM-CPF 500 transmits messages to the SCP instead of directly transmitting the messages to the BM-UPF 520, messaging between NFs may occur in a method in which the SCP searches for/discovers a destination based on information which the NRF or the SCP itself has, and transfers the message to the appropriate NF to allow processing thereof.

Figure 6:
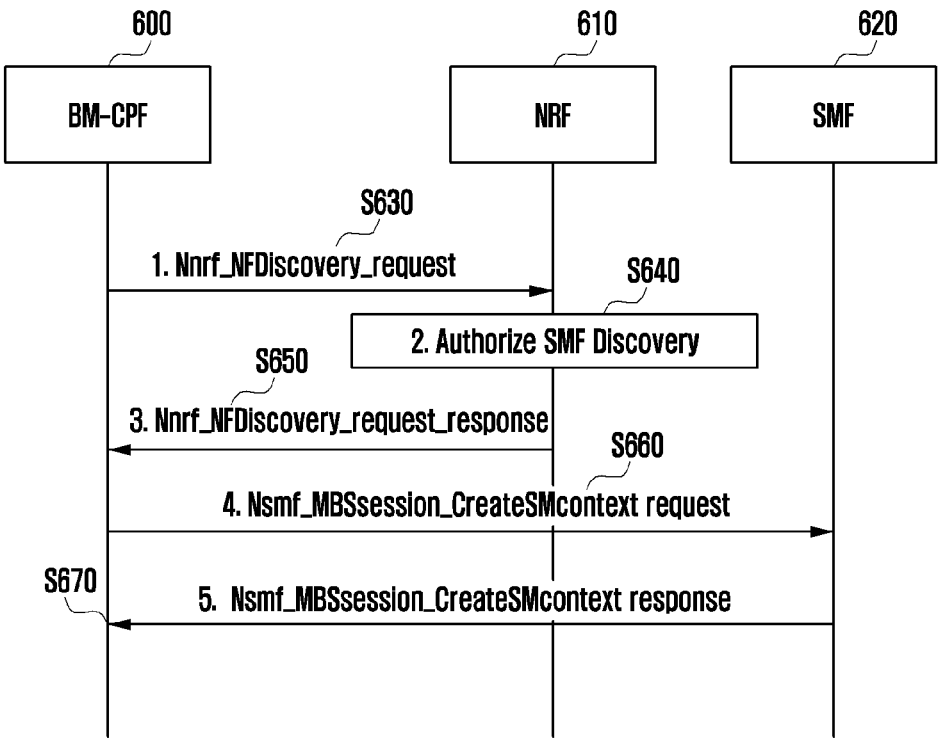
FIG. 6 illustrates a process in which a BM-CPF selects an appropriate SMF to provide an MBS service according to an embodiment of the disclosure.

Meanwhile, FIG. 6 illustrates a process in which a BM-CPF 600 selects an appropriate SMF to provide an MBS service according to an embodiment of the disclosure.

The BM-CPF 600 may transmit MBS service traffic having arrived at a media anchor, for example, a BM-UPF, to an appropriate GW or UPF, and may transmit the same to a terminal via multicast or broadcast. Alternatively, the BM-CPF 600 may transmit an Nnrf_NFDiscovery_Request request message to an NRF 610 in order to select an SMF, which is an NF for controlling a session and a GW, so as to transmit the MBS service traffic to the terminal via unicast (operation S630). Here, the Nnrf_NFDiscovery_Request request message may include target NF service=Nsmf_PDUSession, Nsmf_Multicast&BroadcastPDUSession, NF type of target NF=SMF, PLMN ID, an indicator indicating whether to support transmission of MBS session traffic only via broadcast/multicast or to support transmission of MBS session traffic via not only broadcast/multicast but also unicast, an IP version, an MBS service ID indicating the type of MBS service that BM-CPF desires to provide, MBS service coverage in which service is to be performed, for example, MBS service area, a part or all of a TAI list, a cell ID list, or DNAI, and a broadcast group ID list, which is a list of groups of reception terminals targeting a service, for example, a range of a corresponding TMGI or a TMGI list. Alternatively, the message may include a part or all of information such as network slice info (e.g., S-NSSAI, NW slice instance ID) to which the SMF belongs.

Upon receiving the message, the NRF 610 may identify that the SMF discovery is allowed for the NF and search for/discover an appropriate SMF 620 from the profiles of the SMF registered in the NRF 610 (operation S640), and may transfer information of the discovered SMF(s) to the BM-CPF 600 through the Nnrf_NFDiscovery_Request response message (operation S650). As method of searching for/discovering the appropriate SMF 620, a method of finding the profile of the SMF, which is determined to be the most consistent with all or part of the information, which is transmitted by including in the Nnrf_NFDiscovery_Request request message, may be used. The information of SMF(s) included in the Nnrf_NFDiscovery_Request response message may include NF type=SMF, NF instance ID, FQDN or IP address(es) of the NF instance, a list of services instances, whether only broadcast/multicast is supported, whether not only broadcast/multicast but also unicast transmission are supported, whether the SMF supports switching between unicast and broadcast/multicast, and whether the SMF supports steering between unicast and broadcast/multicast. In addition, the information of SMF(s) may include a part or all of NF load information or MBS service ID of the SMF(s), MBS service area, TAI list, PLMN ID, S-NSSAI(s), and DNAI.

The BM-CPF 600 may transfer an Nbm_Session_Establishment request message to the selected SMF(s) among the discovered SMF(s) through (operation S660). The request message may include a FQDN or IP address of the BM-UPF and a tunnel ID value, which are used for transmission of the corresponding MBS service session from the BM-UPF, and may also include the MBS Session ID for managing the MBS session. In addition, the message may include an indicator indicating that the MBS session traffic is transmitted via broadcast/multicast. In addition, the message may include an indicator indicating whether or not the SMF 620 allows switching or steering of the MBS session traffic between unicast and broadcast/multicast. Upon receiving the request message, the SMF 620 may generate an MBS PDU session and an SM context in order to control the MBS session. The MBS PDU session ID may be allocated by the BM-CPF and included in the request message, or the SMF having received the request message may directly allocate the MBS PDU Session ID. In addition, the SMF may select an appropriate UPF to generate a tunnel between the BM-UPF and the selected UPF, and may include the FQDN for the corresponding UPF or tunnel information such as IP address and tunnel ID in the Nsmf_MBSsession_CreateSM context response message and transmit the same to the BM-CPF 600 (operation S670). In addition, when the BM-CPF 600 allows switching or steering of the MBS session traffic between unicast and broadcast/multicast, information about whether the corresponding session traffic is transferred via unicast or broadcast/multicast may be included in the response message, and whenever the transmission method is changed, information about the changed transmission method may be transferred to the BM-CPF 600.

If the SMF 620 already has the SM context for the corresponding MBS session, in operations S660 and S670, instead of Nsmf_MBSsession_CreateSMcontext, as Nsmf_MBSsession_modifySMcontext service, MBS PDU Session SMcontext may be modified through the Nsmf_MBSsession_modify SMcontext request message and Nsmf_MBSsession_modify SMcontext response message, or instead of Nsmf_MBSsession_CreateSMcontext, as Nsmf_MBSsession_releaseSMcontext service, the MBS PDU Session SMcontext may be released through the Nsmf_MBSsession_releaseSMcontext request message and Nsmf_MBSsession_releaseSMcontext response message.

In a case of using service communication proxy (SCP) in 5GS, if transmission of the messages to the SCP occurs instead of directly transmitting messages between the BM-CPF and the SMF, messaging between NFs may occur in a method in which the SCP searches for/discovers a destination based on information which the NRF or the SCP itself has, and transfers the message to an appropriate NF to allow processing thereof.

Figure 7:
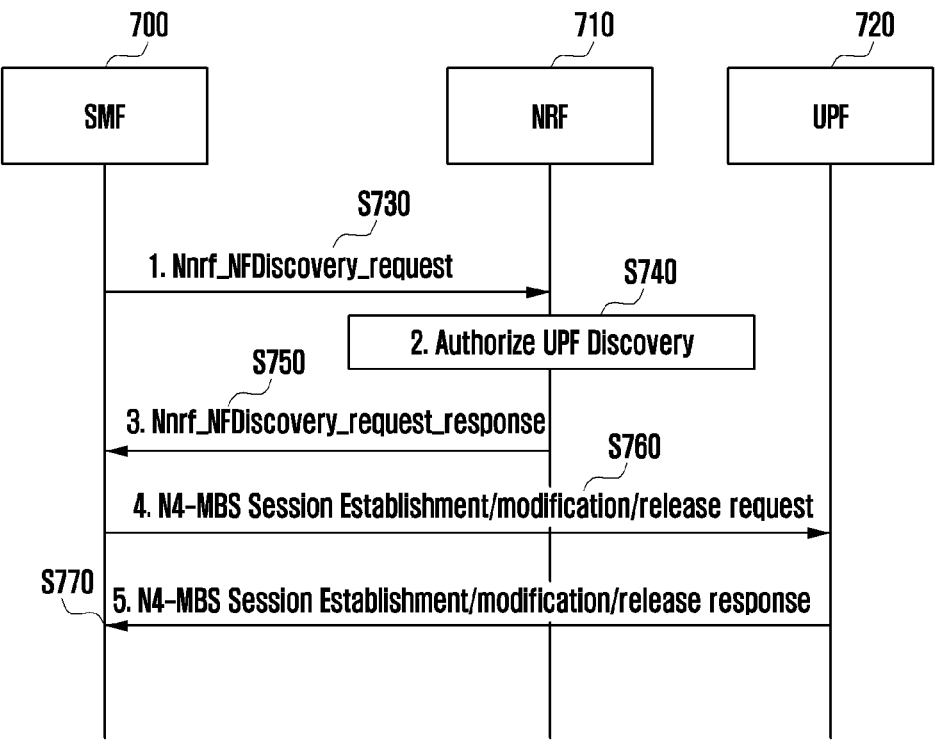
FIG. 7 illustrates a process in which an SMF selects an appropriate UPF to provide an MBS service according to an embodiment of the disclosure.

FIG. 7 illustrates a process in which an SMF 700 selects an appropriate UPF to transmit MBS service traffic according to an embodiment of the disclosure.

The SMF 700 may transmit an Nnrf_NFDiscovery_Request request message to an NRF 710 in order to control a session so as to transmit MBS service traffic having arrived at a media anchor, for example, a BM-UPF, to an appropriate UPF 720, and transmit the same to a terminal via multicast or broadcast or via unicast (operation S730). Here, the Nnrf_NFDiscovery_Request request message may include target NF service=Nupf_PDUSession or Nupf_Multicast&BroadcastPDUSession, NF type of target NF=UPF, PLMN ID, an indicator indicating whether to support transmission of MBS session traffic only via broadcast/multicast or to support transmission of MBS session traffic via not only broadcast/multicast but also unicast, an IP version, an MBS service ID indicating the type of MBS service that the SMF desires to provide, MBS service coverage in which service is to be performed, for example, MBS service area, or a part or all of a TAI list, a cell ID list, or DNAI, and a broadcast group ID list, which is a list of groups of reception terminals targeting a service, for example, a range of a corresponding TMGI or a TMGI list. Alternatively, the message may include a part or all of information such as network slice info (e.g., S-NSSAI, NW slice instance ID) to which the UPF 720 belongs.

In the target NF service, when the SMF 700 transmits the corresponding MBS session traffic via unicast, the target NF service may be configured as target NF service=Nupf_PDUSession. On the other hand, when the SMF 700 transmits the corresponding MBS session traffic via broadcast/multicast, the target NF service may be configured as target NF service=Nupf_Multicast&BroadcastPDUSession. In addition, in a case of unicast transmission, an indicator indicating that the MBS session traffic is transmitted only via unicast may be used, or an indicator indicating that both transmission via unicast and transmission via broadcast/multicast are supported may be used. On the other hand, when the MBS session traffic is transmitted via multicast, an indicator indicating that the MBS session traffic is transmitted only via broadcast/multicast or an indicator indicating that both transmission via unicast and transmission via broadcast/multicast transmission are supported may be used. Upon receiving the message, the NRF 710 may identify that the UPF discovery is allowed for the NF and search for/discover an appropriate UPF from the profiles of the UPF registered in the NRF 710 (operation S740), and may transfer information of the discovered UPF(s) to the SMF 700 through the Nnrf_NFDiscovery_Request response message (operation S750). As method of searching for/discovering the appropriate UPF 720, a method of finding the profile of the UPF, which is determined to be the most consistent with all or part of the information, which is transmitted by including in the Nnrf_NFDiscovery_Request request message, may be used. The information of UPF(s) included in the Nnrf_NFDiscovery_Request response message may include NF type=UPF, NF instance ID, FQDN or IP address(es) of the NF instance, a list of services instances, information indicating whether to support only broadcast/multicast, whether to support transmission via not only broadcast/multicast but also unicast, whether to support transmission via unicast only, whether the UPF 720 supports switching between unicast and broadcast/multicast, or whether the UPF 720 supports steering between unicast and broadcast/multicast. In addition, the information of the UPF may include a part or all of NF load information or MBS service ID of the UPF(s), MBS service area, TAI list, PLMN ID, S-NSSAI(s), or DNAI.

The SMF 700 may transfer an N4-MBS Session Establishment request message to the selected UFP (s) among the discovered UPF(s) (operation S760). The request message may include a FQDN or IP address of the BM-UPF and a tunnel ID value, which are used for transmission of the corresponding MBS service session from the BM-UPF, and may also include the MBS Session ID for managing the MBS session. In addition, the request message may include an indicator indicating whether the MBS session traffic is to be transmitted via broadcast/multicast, transmitted via unicast, or transmitted via both broadcast/multicast and unicast. In addition, the request message may include information indicating whether to switch the MBS session traffic between unicast and broadcast/multicast or support steering therebetween, and if it is determined to support steering, information indicating a method for supporting. For example, when the terminal has gone out of the broadcast/ multicast service area and the same is recognized, the MBS session traffic transmission is switched to unicast, or when there is a special need for high availability, information allowing two methods of unicast and broadcast/multicast to be used for simultaneous traffic transmission may be included in the request message.

Upon receiving the request message, the UPF 720 generates a tunnel to transmit the MBS session traffic under the control of the SMF 700. In order to generate a tunnel for the BM-UPF and UPF 720, the FQDN or IP address of the BM-UPF received from the SMF 700 may be used. In addition, in order to configure a tunnel endpoint in the UPF 720, the FQDN or IP address of the UPF 720 and tunnel ID information may be included in the N4-MBS session establishment response message to be transferred to the SMF 700 (operation S760). In addition, in order to generate a tunnel for IP multicast between the UPF 720 and NG-RANs, an IP address and tunnel ID for IP multicast are allocated and included in the N4-MBS session establishment response message and transferred to the SMF 700 (operation S770). The IP address and tunnel ID value for IP multicast may be directly allocated by the SMF 700 and transferred to the UPF 720 through the N4-MBS session establishment request message.

The UPF 720 may transfer the MBS session traffic through an IP multicast tunnel or through a unicast tunnel under the control of the SMF 700, or may transfer the MBS session traffic to the NG-RAN by using two methods at the same time.

If the SMF 700 already has a control session for the corresponding UPF 720, in operations S760 and S770, instead of N4-MBS session Establishment, as an N4-MBS Session modification service, a context of MBS session of the UPF may be modified through the N4-MBS Session modification request message and N4-MBS Session modification response message, or instead of N4-MBS Session Establishment, as an N4-MBS Session release service, the context of MBS session of the UPF 720 may be released through the N4-MBS Session release request message and N4-MBS Session release response message.

In a case of using service communication proxy (SCP) in 5GS, if the SMF transmits messages to the SCP instead of directly transmitting the messages between the SMFs, messaging between NFs may occur in a method in which the SCP searches for/discovers a destination based on information which the NRF or the SCP itself has, and transfers the message to the appropriate NF to allow processing thereof.

Figure 8:
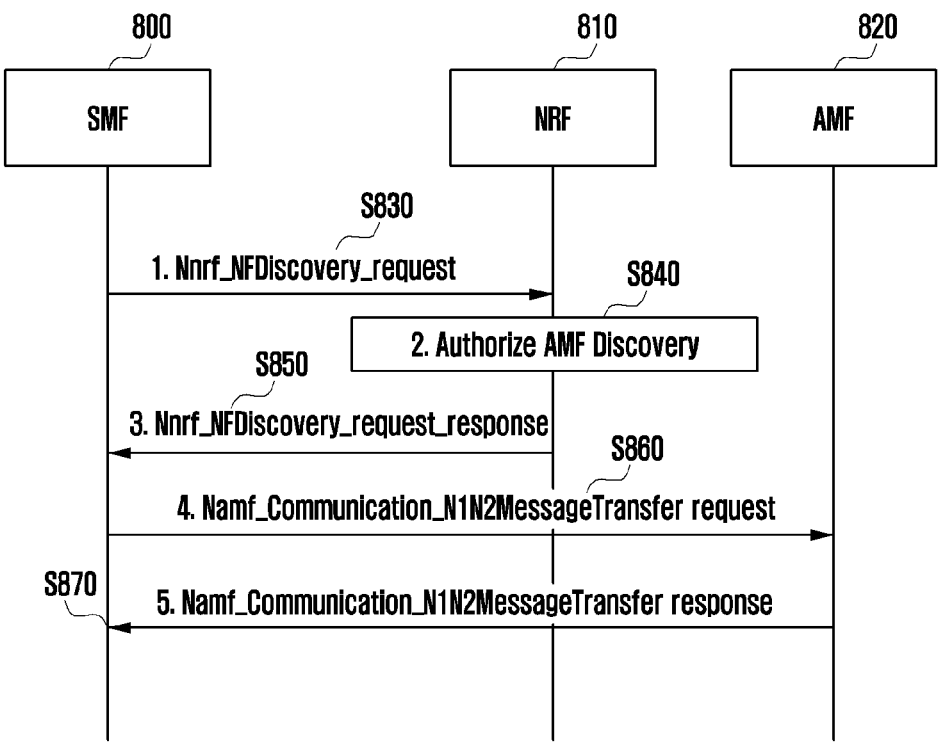
FIG. 8 illustrates a process in which an SMF selects an appropriate AMF to provide an MBS service according to an embodiment of the disclosure.

FIG. 8 illustrates a process in which the SMF 800 selects an appropriate AMF 820 to transmit MBS service traffic according to an embodiment of the disclosure.

The SMF 800 may select an appropriate AMF 820 to transfer pieces of control information, such as IP multicast information for reception of the MBS service traffic, to an NG-RAN placed at a position to which the MBS service traffic is to be transmitted from the UPF via multicast. To this end, the SMF 800 may transmit an Nnrf_NFDiscovery_Request request message to an NRF 810 (operation S830). Here, the Nnrf_NFDiscovery_Request request message may include target NF service=Namf_Communication_N1N2MessageTransfer or Namf_Communication_M3 MessageTransfer, NF type of target NF=AMF, PLMN ID, and an indicator indicating that M3 interface, which is an interface for MBS with NG-MCE/NG-RAN, is setup. In addition, the Nnrf_NFDiscovery_Request request message may include MBS service coverage in which service is to be performed, for example, MBS service area, or a part or all of a TAI list, a cell ID list, a target AMF set, a regional ID, or DNAI. In addition, the request message may include a broadcast group ID list, which is a list of groups of reception terminals targeting a service, for example, a range of a corresponding TMGI or a TMGI list. Alternatively, the Nnrf_NFDiscovery_Request request message may include a part or all of information such as network slice info (e.g., S-NSSAI, NW slice instance ID) to which the AMF should support.

Upon receiving the message, the NRF 810 may identify that the AMF discovery is allowed for the NF and search for/discover appropriate AMFs from the profiles of the AMFs registered in the NRF (operation S840), and may transfer information of the discovered AMF(s) to the SMF 800 through the Nnrf_NFDiscovery_Request response message (operation S850). As a method of searching for/discovering the appropriate AMF(s), a method of finding the profile of the AMF, which is determined to be the most consistent with all or part of the information, which is transmitted by including in the Nnrf_NFDiscovery_Request request message, may be used. For example, the NRF 810 may find out AMFs so that the NG-RANs connected to the AMFs through M3 interface can sufficiently cover the target MBS service area, and may notify the SMF 800 of the same.

The information of AMF(s) included in the Nnrf_NFDiscovery_Request response message may include NF type=AMF, NF instance ID, FQDN, IP address(es), or GUAMI of the NF instance, a list of services instances, information indicating whether M3 interface, which is an interface for MBS between the AMF and NG-MCE/NG-RAN, is set up. In addition, the information of the AMF(s) included in the Nnrf_NFDiscovery_Request response message may include a part or all of NF load information of the AMF(s), the area of the MBS service that can be covered through the NG-MCE to which the AMF is connected, a TAI list, a cell ID list, DNAI, or S-NSSAI information supported by the AMF.

The SMF 800 may select an AMF(s) 820 corresponding to an area to be serviced from among the found AMF(s), and may transmit a Namf_Communication_N1N2MessageTransfer request message or a Namf_Communication_M3 MessageTransfer request message (operation S860). In addition, at least one AMF having received the message may transmit a control message included in the request message, for example, IP multicast tunnel information, which is used for the base station to receive IP multicast for the MBS service traffic, to the connected NG-MCEs. In addition, information including a message requesting join to IP multicast from the base station having received the control message is transmitted to the SMF 800 through the Namf_Communication_N1N2MessageTransfer response through the AMF 820 (operation S870).

Figure 9:
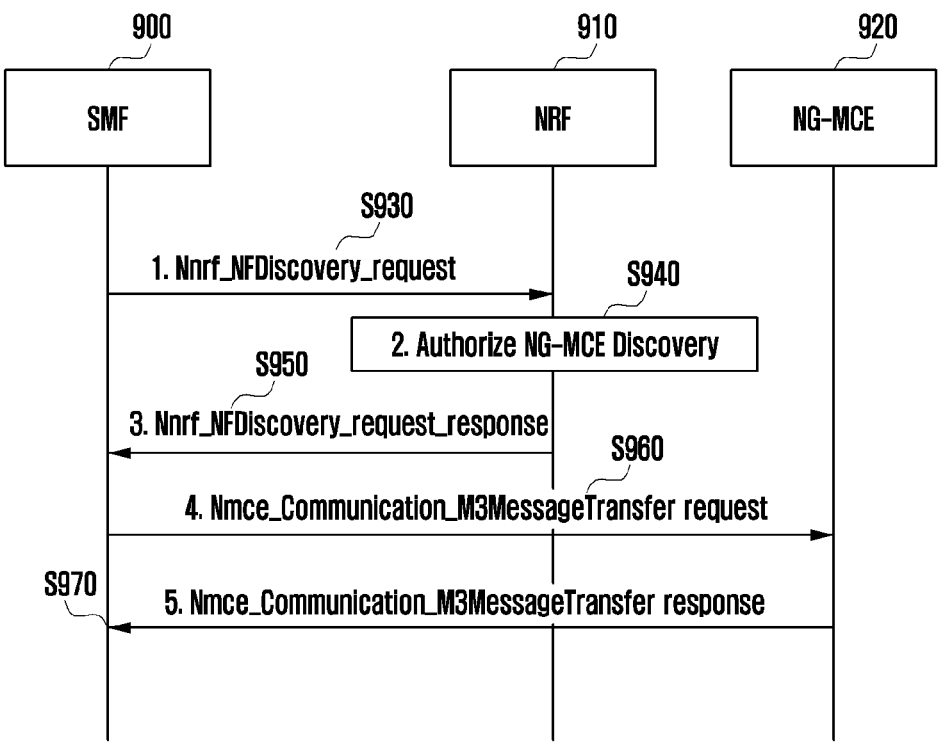
FIG. 9 illustrates a process in which an SMF selects an appropriate NG-MCE to provide an MBS service according to an embodiment of the disclosure.

On the other hand, FIG. 9 illustrates a process in which an SMF selects an appropriate NG-MCE to transmit MBS service traffic in a network structure in which the SMF directly transmits a control message for MBS to the NG-MCE/NG-RAN without going through the AMF as shown in FIG. 1B according to an embodiment of the disclosure.

The SMF 900 may select an appropriate NG-MCE 920 to transfer pieces of control information, such as IP multicast information for reception of the service traffic, to an NG-RAN placed at a location to which the MBS service traffic is to be transmitted from the UPF via multicast. To this end, the SMF 900 may transmit an Nnrf_NFDiscovery_Request request message to the NRF 910 (operation S930). Here, the Nnrf_NFDiscovery_Request request message may include target NF service=Nmce_Communication_M3 MessageTransfer, NF type of target NF=NG-MCE, and PLMN ID. In addition, the Nnrf_NFDiscovery_Request request message may include MBS service coverage to be serviced, for example, MBS service area, or a part or all of a TAI list, a cell ID list, or DNAI, and a broadcast group ID list, which is a list of groups of reception terminals targeting a service, for example, a range of a corresponding TMGI or a TMGI list. Alternatively, the Nnrf_NFDiscovery_Request request message may include a part or all of information such as network slice info (e.g., S-NSSAI, NW slice instance ID) to which the NG-MCE should support.

Upon receiving the message, the NRF 910 may identify that the NG-MCE discovery is allowed for the NF and search for/discover appropriate NG-MCEs from the profiles of the NG-MCEs registered in the NRF (operation S940), and may transfer information of the discovered NG-MCE(s) to the SMF 900 through the Nnrf_NFDiscovery_Request response message (operation S950). As a method of searching for/discovering the appropriate NG-MCE(s), a method of finding the profile of the NG-MCE, which is determined to be the most consistent with all or part of the information, which is transmitted by including in the Nnrf_NFDiscovery_Request request message, may be used. For example, the NRF may find out NG-MCEs so that the NG-RANs connected to the NG-MCEs through M2 interface can sufficiently cover the target MBS service area, and may notify the SMF 900 of the same.

For example, the information of NG-MCE(s) included in the Nnrf_NFDiscovery_Request response message may include NF type=NG-MCE, NF instance ID, FQDN and IP address(es) of the NF instance, a list of services instances, information indicating whether M2 interface, which is an interface for MBS between the NG-MCE and NG-RAN, is set up. In addition, the information of the NG-MCE(s) included in the Nnrf_NFDiscovery_Request response message may include a part or all of NF load information of the NG-MCE(s), the area of the MBS service that can be covered by the NG-MCE, a TAI list, a cell ID list, DNAI, or S-NSSAI information supported by the AMF.

The SMF 900 may select an NG-MCE(s) corresponding to an area to be serviced from among the discovered NG-MCE(s), and may transmit an Nmce_Communication_M3MessageTransfer request message (operation S960). At least one NG-MCE 920 having received the message may transmit a control message included in the request message, for example, IP multicast tunnel information, which is used for the base station to receive IP multicast for the MBS service traffic, to the connected NG-RANs. In addition, information including a message requesting join to IP multicast from the NG-RAN having received the control message may be transmitted to the SMF through the Nmce_Communication_M3MessageTransfer response through the NG-MCE.

Figure 10:
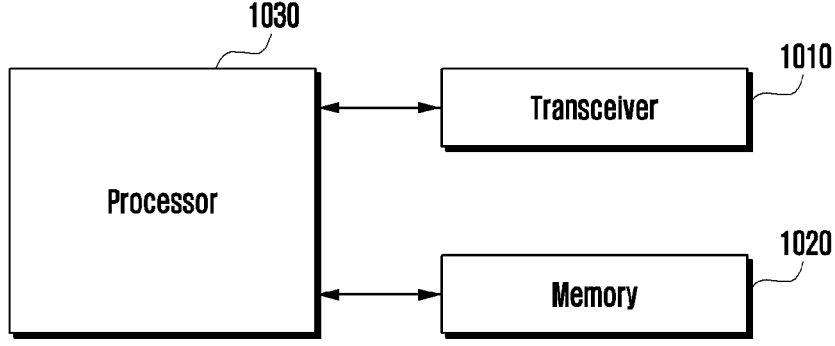
FIG. 10 illustrates a structure of a first entity in a wireless communication system according to an embodiment of the disclosure.

Meanwhile, FIG. 10 illustrates a structure of a first entity in a wireless communication system according to an embodiment of the disclosure. The first entity may be a BM-CPF, as an MBS function.

Referring to FIG. 10, the first entity may include a transceiver 1010, a memory 1020, and a processor 1030. According to the control method of the first entity described above, the transceiver 1010 and the processor 1030 of the first entity may operate. However, the elements of the first entity are not limited to the above-described example. For example, the first entity may include more or fewer elements than the elements described above. In addition, the transceiver 1010, the memory 1020, and the processor 1030 may be implemented in the form of a single chip.

The transceiver 1010 may transmit or receive signals to or from other entities. Here, the signal may include control information and data. To this end, the transceiver 1010 may include an RF transmitter configured to up-convert and amplify a frequency of a transmitted signal, and an RF receiver configured to perform low-noise amplification of a received signal and to perform down conversion of a frequency. However, this is only an embodiment of the transceiver 1010, and the elements of the transceiver 1010 are not limited to the RF transmitter and the RF receiver.

The memory 1020 may store programs and data required for the operation of the first entity. In addition, the memory 1020 may store control information or data included in signals transmitted from or received by the first entity. The memory 1020 may include a storage medium such as a ROM, a RAM, a hard disk, a CD-ROM, and a DVD, or a combination of storage media. In addition, there may be a plurality of memories 1020.

In addition, the processor 1030 may be configured to control a series of processes so as to allow the first entity to be operated according to the above-described embodiment. There may be a plurality of processors 1030, and the processor 1030 may perform an operation of controlling elements of the first entity by executing a program stored in the memory 1020.

For example, the processor 1030 may be configured to control the transceiver 1010 to receive information on data traffic of a multicast/broadcast service (MBS) session, and receive Internet protocol (IP) address information of a second entity.

In addition, the processor 1030 may generate context information for management of the MBS session, and may establish a control session for the second entity based on the IP address information of the second entity and the context information.

In addition, the processor 1030 may be configured to determine a transmission method for MBS data traffic. Here, the transmission method may be one of broadcast, multicast, or unicast transmission methods.

When the transmission method is determined as a broadcast or multicast transmission method, the processor 1030 may be configured to perform control to generate a transmission tunnel with the second entity, with regard to at least one base station corresponding to an area to which the MBS data traffic is transmitted.

If the first entity is determined, by a third entity, to be an entity corresponding to a MBS service requested by an application function (AF) entity, the processor 1030 may be configured to perform control to receive a request for generation of the MBS service.

Further, the processor 1030 may be configured to control the transceiver 1010 to transmit a response message including information on the second entity and information on a transmission method for MBS data traffic based on the received MBS service generation request.

Figure 11:
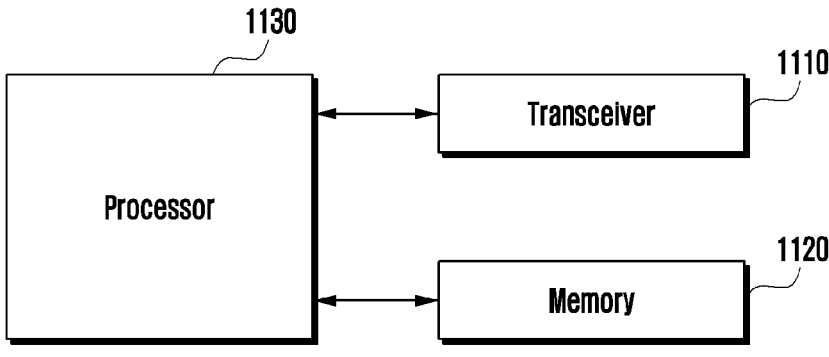
FIG. 11 illustrates a structure of a second entity in a wireless communication system according to an embodiment of the disclosure.

In addition, the processor 1030 may be configured to transmit information on the MBS service to a third entity in order to discover the second entity, and when the second entity is discovered by the third entity, the processor may be configured to control the transceiver 1010 to transmit the MBS session generation request to the second entity. FIG. 11 illustrates a structure of a second entity in a wireless communication system according to an embodiment of the disclosure. The second entity may be a BM-UPF, as a media anchor.

Referring to FIG. 11, the second entity may include a transceiver 1110, a memory 1120, and a processor 1130. According to the control method of the second entity described above, the transceiver 1110 and the processor 1130 of the second entity may operate. However, the elements of the second entity are not limited to the above-described example. For example, the second entity may include more or fewer elements than the elements described above. In addition, the transceiver 1110, the memory 1120, and the processor 1130 may be implemented in the form of a single chip.

The transceiver 1110 may transmit or receive signals to or from other entities. Here, the signal may include control information and data. To this end, the transceiver 1110 may include an RF transmitter configured to up-convert and amplify a frequency of a transmitted signal, and an RF receiver configured to perform low-noise amplification of a received signal and perform down conversion of a frequency. However, this is only an embodiment of the transceiver 1110, and elements of the transceiver 1110 are not limited to the RF transmitter and the RF receiver.

The memory 1120 may store programs and data required for the operation of the second entity. In addition, the memory 1120 may store control information or data included in signals transmitted from or received by the second entity. The memory 1120 may include a storage medium such as a ROM, a RAM, a hard disk, a CD-ROM, and a DVD, or a combination of storage media. In addition, there may be a plurality of memories 1120.

The processor 1130 may be configured to control a series of processes so as to allow the second entity to be operated according to the above-described embodiment. There may be a plurality of processors 1130, and the processor 1130 may perform an operation of controlling elements of the second entity by executing a program stored in the memory 1120.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method performed by a session management function (SMF) entity, the method comprising:

transmitting, to a network repository function (NRF) entity, a first request message to discover one or more access and mobility management function (AMF) entities, based on a multicast/broadcast service (MBS) service area, wherein the first request message includes a tracking area identity (TAI) list associated with the MBS service area;

selecting at least one AMF among the discovered one or more AMF entities supporting the MBS, based on the first request message transmitted to the NRF entity; and transmitting, to the selected at least one AMF, a second request message including control information for transferring the control information to at least one next generation (NG)-radio access network (RAN) supporting the MBS based on the MBS service area.

2. The method of claim 1, wherein the at least one AMF is selected to be corresponded to an area that is served among the discovered one or more AMF entities supporting the MBS.

3. The method of claim 1, further comprising:

receiving, from an NG-RAN among the at least one NG-RAN via the selected at least one AMF, a setup response message for joining a multicast group.

4. A session management function (SMF) entity, the SMF entity comprising:

a transceiver; and at least one processor is configured to:

transmit, to a network repository function (NRF) entity via the transceiver, a first request message to discover one or more access and mobility management function (AMF) entities, based on a multicast/broadcast service (MBS) service area, wherein the first request message includes a tracking area identity (TAI) list associated with the MBS service area, select one or more at least one AMF among the discovered one or more AMF entities supporting the MBS, based on the first request message transmitted to the NRF entity, and transmit, to the selected at least one AMF via the transceiver, a second request message including control information for transferring the control information to at least one next generation (NG)-radio access network (RAN) supporting the MBS based on the MBS service area.

5. The SMF entity of claim 4, wherein the at least one AMF is selected to be corresponded to an area that is served among the discovered one or more AMF entities supporting the MBS.

6. The SMF entity of claim 4, wherein the at least one processor is further configured to receive, from an NG-RAN among the at least one NG-RAN via the selected at least one AMF via the transceiver, a setup response message for joining a multicast group.

* * * * *